United States Patent [19]

Suzuki et al.

[11] Patent Number: 4,589,023

[45] Date of Patent: May 13, 1986

[54] ELECTRONIC CAMERA

[75] Inventors: Shigeo Suzuki; Kiyoshi Kawano; Kimiaki Ogawa; Harumi Aoki, all of Tokyo, Japan

[73] Assignee: Asahi Kogaku Kogyo Kabushiki Kaisha, Tokyo, Japan

[21] Appl. No.: 563,489

[22] Filed: Dec. 20, 1983

[30] Foreign Application Priority Data

Dec. 20, 1982 [JP] Japan .............................. 57/223546
Jan. 19, 1983 [JP] Japan .................................. 58/6870

[51] Int. Cl.$^4$ .............................................. H01N 3/14
[52] U.S. Cl. ..................................... 358/213; 358/225
[58] Field of Search ............... 358/225, 226, 227, 228, 358/224, 213, 209, 85, 906, 909, 41, 335; 352/136, 137, 140; 354/219, 224, 241, 245, 246, 243.1

[56] References Cited

U.S. PATENT DOCUMENTS

4,366,501 12/1982 Tsunekawa et al. ................. 358/310
4,472,744 9/1984 Inoue et al. .......................... 358/293

Primary Examiner—Gene Z. Rubinson
Assistant Examiner—Robert G. Lev
Attorney, Agent, or Firm—Sughrue, Mion, Zinn, Macpeak & Seas

[57] ABSTRACT

An electronic camera having both bright viewfinder image and a minimal effect of dark current on the image output signal. A quick-return mirror, normally positioned in the path of the flux of light from the object image, guides the flux of light into the optical viewfinder system. The quick-return mirror is retractable to allow the flux of light to fall onto an image pickup device. A vertical synchronizing signal generator issues a signal for discharging electric charges stored in the image pickup device after the release switch has been turned on and before the quick-return mirror begins its movement out of the light flux path and issues a signal for reading out electric charges which have been stored in the image pickup device while the shutter is open after an exposure operation has been completed. The frequency of scanning for discharging the electric charges is higher than the frequency for scanning for reading out the electric charges subsequent to the photographing operation.

5 Claims, 13 Drawing Figures

ELECTRONIC CAMERA

BACKGROUND OF THE INVENTION

The present invention relates to a single-lens reflex electronic still camera including an image pickup device for photoelectrically converting the image of an object, a memory device for storing a still-image signal produced by the image pickup device, and an optical viewfinder.

Such an electronic still camera employs an image pickup device such as a solid-state image pickup device for producing electric signals representative of the brightness of an object image and a magnetic disk or semiconductor memory for storing the generated electric signals. Many such electronic cameras have been proposed as a substitute for the film conventional cameras because of the advantages that it is not necessary to use film requiring chemical treatment and the images can quickly be reproduced on a television receiver.

The electronic cameras can incorporate many types of viewfinder systems found in the prior art film cameras, and also can use an electronic viewfinder employed in an ordinary video camera utilizing the image pickup device of the electronic camera. Of these viewfinder systems, the so-called single-lens reflex viewfinder is functionally the best since the viewfinder area is as big as the image area, and interchangeable lenses can be employed.

Two types of single-lens reflex viewfinders are known. One single-lens reflex viewfinder type has a half-silvered mirror or beam splitter disposed in the image light path for reflecting part of the light into the optical viewfinder system. The other viewfinder construction uses a so-called quick-return mirror for guiding the image light selectively into the optical viewfinder system and the optical photographing system. The quick-return mirror viewfinder system is considered to be advantageous over the half-silvered mirror viewfinder system in that, although it has moving parts, the image visible through the viewfinder is bright, and there is no reduction in the quantity of light reaching the photographing system.

For incorporating the single-lens reflex viewfinder, particularly such a viewfinder of the quick-return mirror type, into the electronic camera, it is required that the drive unit for the quick-return mirror be electrically connected to the photographing system, resulting in the need of a novel mechanism different from those of conventional cameras using film.

Prior electronic cameras employing the single-lens reflex viewfinder with the half-silvered mirror have suffered from drawbacks in that the image on the viewfinder is relatively dark and the quantity of light entering the photographing system is reduced, resulting in a failure to provide a good quality still image of a dark object. The reduction in the amount of image light available for photographing is particularly disadvantageous since presently available solid-state image pickup devices have a lower sensitivity than film.

Another problem relates to the generation of signals for reading electric charges from the image pickup device. A prior video camera, for example, uses an image pickup device for photoelectrically converting the optical image of an object, the image pickup device being driven by a vertical synchronizing signal composed of cyclic pulses each having a period of one field (1/60 sec. in the NTSC system). With such pulses being used both for discharging unwanted stored electric charges prior to photographing and for effecting the reading of electric charges serving as still-image signals, an appreciable period of time is required for an exposure to be effected after a release button has been depressed and for electric charges to be read out after exposure has been completed. This results in an appreciable undesired dark current which reduces the quality of an image. The problem of delayed photographing operation cannot be avoided. For the above reasons, it is not advisable to apply these video camera techniques to an electronic still camera.

The mirror and shutter could be electrically driven by utilizing a motor drive unit from prior cameras. However, the conventional motor drive unit has a takeup mechanism of a complicated construction for winding film with a large force and over a relatively long interval of time. The electric circuit for such a motor drive unit is also complex as it requires a switch mechanism for indicating the completion of a film winding operation. Therefore, the prior motor drive unit arrangement cannot be directly incorporated into an electronic still camera.

SUMMARY OF THE INVENTION

It is a first object of the present invention to obtain bright viewfinder images by employing a quick-return mirror while obtaining good quality still images of dark objects by utilizing the quantity of light falling on an image pickup device to the maximum extent.

A second object of the present invention is to allow quick photographing operations while providing still images of the best quality by discharging unwanted electric charges from an image pickup device at the same time that a release switch is pushed and reading electric charges, which form a still-image signal, out of the image pickup device very quickly after the release switch is pushed.

Still another object of the present invention is to provide a small-size electronic camera having a mechanism for driving a shutter and a mirror which includes no takeup mechanism and having a drive motor energizable simultaneously with the completion of a shutter operation and de-energizable simultaneously with the completion of shutter and mirror driving for thereby enabling successive photographing operations.

Achieving the foregoing objects, an electronic camera according to the present invention includes an optical view-finder system and in which the image of an object focused by a photographic lens with an image pickup device is photoelectrically converted. An image signal generated by the image pickup device is stored in a memory. The electronic camera of the invention includes a shutter for controlling the flux of light from the object image falling on the image pickup device, an exposure control device for controlling the amount of exposure through the shutter dependent on the brightness of the object image, a quick-return mirror normally positioned in the path of the flux of light from the object image for guiding the flux of light into the optical viewfinder system with the quick-return mirror being retractable out of the path for allowing the flux of light to fall on the image pickup device, a release switch for generating a photographing start signal, and a vertical synchronizing signal generator for issuing a vertical synchronizing signal aperiodically to the image pickup device. The vertical synchronizing signal generator issues a signal effecting the discharge of electric charges stored in the image pickup device after the release switch has been pushed and before the quick-return mirror starts being retracted out of the path. Also, it issues a signal for reading out electric charges which have been stored in the image pickup device while the shutter is being open after an exposure operation has been finished by the shutter.

Further, according to the present invention, the problem of the reduction of the image quality due to dark current and delayed photographing operation is solved by setting the frequency of scanning an image pickup device for discharging stored electric charges higher than the frequency of scanning the image pickup device for reading out stored electric charges. The scanning for discharging the stored electric charges is not required to be carried out at a high speed since it is effected after a photographing operation has been finished. By effecting the discharging scanning at a speed higher than that of the reading scanning, the time spent after a shutter is released and before an exposure is made is reduced, and therefore no reduction in the image quality is caused due to dark current; thus exposure can take place quickly after the shutter release.

DESCRIPTION OF THE PREFERRED EMBODIMENTS

Figure 1:
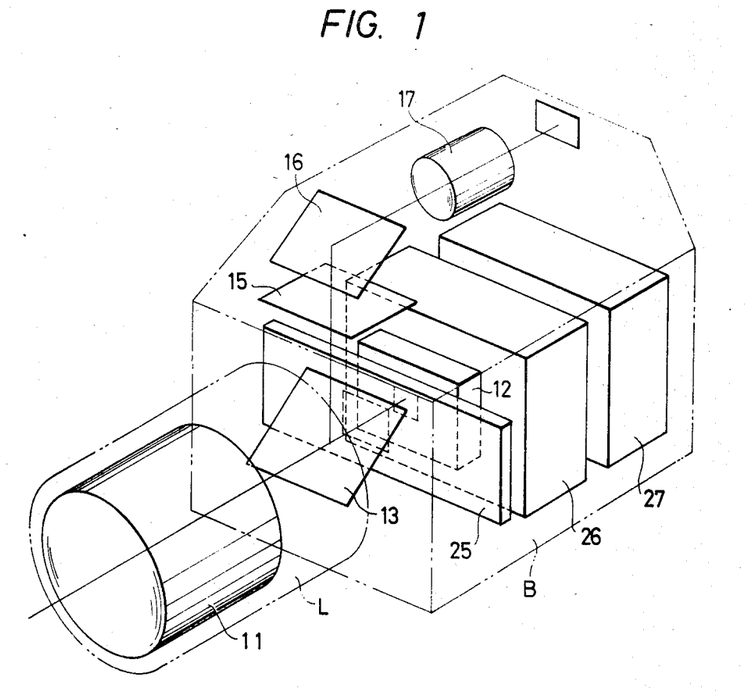
FIG. 1 is a perspective view of a portion of an electronic camera according to a preferred embodiment of the present invention.
Figure 2:
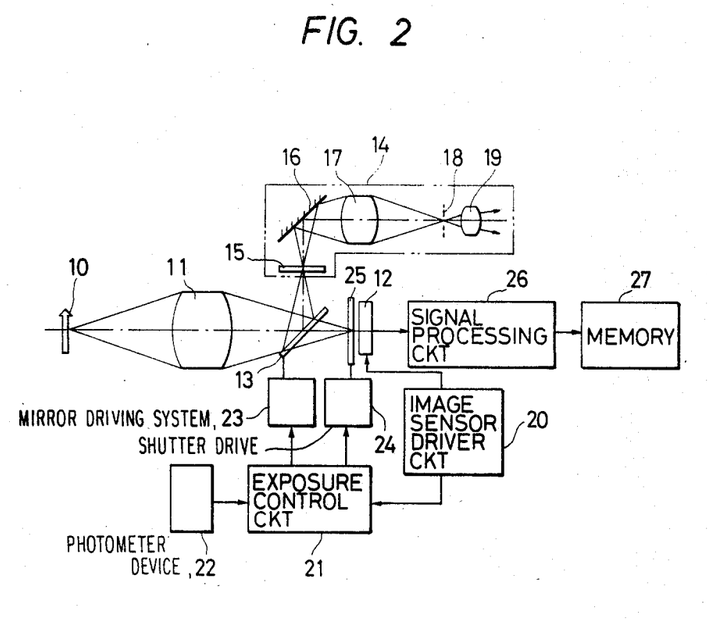
FIG. 2 is a block diagram of an overall camera system including an optical system of the electronic camera.

The present invention will hereinafter be described with reference to a preferred embodiment. FIGS. 1 and 2 show the basic construction of an electronic camera according to the present invention. The electronic camera is composed of a lens barrel L having a photographic lens 11 and a body B housing therein a device for processing the image of an object 10 which is focused by the photographic lens 11. More specifically, this device is composed of an image pickup device (image sensor) 12 positioned on the optical axis, that is, in the path of the flux of light from the image. A shutter 25 and a quick-return mirror 13 are disposed in front of the image sensor 12. The quick-return mirror 13, which is normally held at an angle of 45 degrees to the optical axis, reflects the light flux of the image into an optical viewfinder system 14 having a focusing plate 15, a mirror 16, a relay lens 17, and an eyepiece lens 19. At the time of photographing the image, the quick-return mirror 13 is retracted out of the image light flux to allow the light flux to reach the image sensor 12. The optical viewfinder system 14 may include a conventional pentaprism.

With such an optical system, the image of an object is normally guided through the optical viewfinder system 14 so as to be refocused on a refocusing plane 18 so that the refocused image can be observed through the eyepiece lens 19. When the image is to be photographed, the quick-return mirror 13 is folded up to guide the image light flux toward the image sensor 12.

Electric charges stored in the image sensor 12 are discharged and read out by an image sensor driver circuit 20, an exposure control circuit 21, a photometer device 22, a mirror driving system 23, a shutter driving system 24, a shutter 25, a signal processing circuit 26, and a memory 27 in the following manner: Upon depressing a release switch when an object image is to be photographed, the image sensor driver circuit 20 scans the image sensor 12 for the period of one field or one frame to discharge unwanted electric charges that have been stored in the image sensor 12. The exposure control circuit 21 issues an exposure control signal in response to an output from the photometer device 22 which photoelectrically converts the object image. It is preferable to place the photometer device 22 in the optical viewfinder system 14. After the unwanted electric charges have been discharged from the image sensor 12, the mirror driving system 23 retracts the quick-return mirror 13 out of the image light flux. Then, the shutter 25 is opened by the shutter driving system 24, which operates in response to an output from the exposure control circuit 21. The shutter 25 is then closed after exposure has been effected. Upon completion of the exposure operation, the quick-return mirror 13 returns to its position prior to retraction. Simultaneously, the image sensor driver circuit 20 scans the image sensor 12 for one field or one frame to allow the signal processing circuit 26 to read electric charges that have been stored in the image sensor 12 while the shutter 25 was open. An image signal produced by the signal processing circuit 26 is processed and the result stored in the memory 27. When the shutter 25 is closed, a motor (described below) in the shutter driving system 24 and the mirror driving system is driven to restore forces for driving the shutter 25 and the quick-return mirror 13 in readiness for a next photographing operation.

Figure 3:
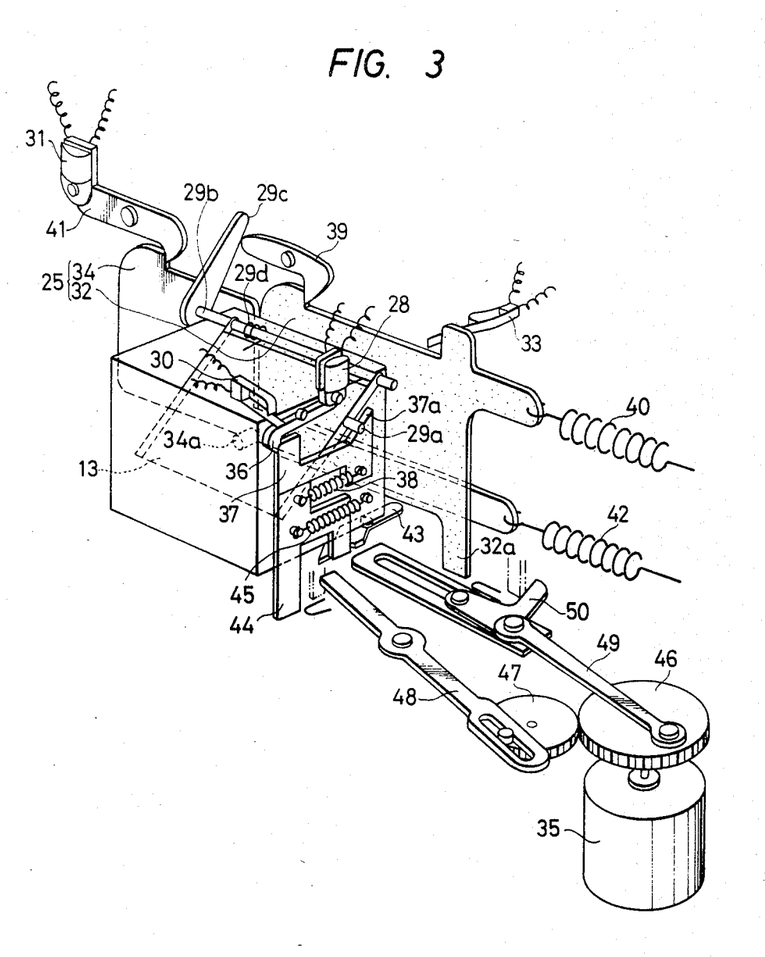
FIG. 3 is a perspective view of a quick-return mirror, a shutter, and mechanism for driving the mirror and the shutter.

FIG. 3 shows mechanisms used for driving the quick-return mirror 13 and the shutter 25, and various timing switches. The shutter 25 is a focal plane shutter which includes a leading curtain 32 and a trailing curtain 34 which are normally pulled to the right in the figure by leading and trailing curtain springs 40 and 42, respectively. The leading and trailing curtains 32 and 34 are held by respective leading and trailing curtain hooks 39 and 41 against the forces of the leading and trailing curtain springs 40 and 42. The leading curtain hook 39 can be disengaged from the leading curtain 32 by a leading curtain disengagement lever 29c, and the trailing curtain hook 41 can be disengaged from the trailing curtain 34 by a trailing curtain magnet 31.

The shutter 25, that is, the leading and trailing curtains 32 and 34, is driven by a motor 35. More specifically, when the motor 35 makes one revolution, a crank lever 49 actuates a shutter driving lever 50 in a single back-and-forth motion, pushing a leading curtain projection 32a to push the leading curtain 32 against the force of the leading curtain spring 40. At the same time, a trailing curtain pin 34a is pushed by the leading curtain 32 to push the trailing curtain 34 against the force of the trailing curtain spring 42. A shutter switch 33 is turned on when the leading curtain 32 is pushed and turned off when the leading curtain 32 starts moving upon being released from the hook 39.

The quick-return mirror 13 is swingable about a mirror shaft 29b mounted on a rear edge thereof and supporting the leading curtain disengagement lever 29c. The quick-return mirror 13 is normally urged by a torsion spring 29d in a direction to be lowered. A mirror-up lever 37 and a mirror-down lever 44 are slidably supported on a mirror box in which the quick-return mirror 13 is housed. The mirror-up lever 37 is normally urged by a spring 38 to move toward the viewer of FIG. 3, and the mirror-down lever 44 is normally urged by a spring 45 to move away from the viewer.

A mirror-up lever engagement pawl 36, which serves to limit the movement of the mirror-up lever 37, can be brought into and out of engagement with the mirror-up lever 37 by a mirror magnet 28. The mirror-up lever 37 has on its rear portion a mirror-up lever cam surface 37a, held in engagement with a pin 29a projecting laterally from a side edge of the quick-return mirror 13, with which the quick-return mirror 13 is folded up when the mirror-up lever 37 is forced to slide forward under the bias of the spring 38.

After the trailing curtain 34 has completed its travelling stroke, the pin 34a projecting therefrom hits a mirror-down lever 44, which causes the quick-return mirror 13 to move down. The quick-return mirror 13 is associated with a mirror switch 30, which is turned on when the quick-return mirror 13 starts rising and turned off when the quick-return mirror 13 starts lowering again. The mirror-down lever 44 and the mirror-up lever 37 can be charged by a mirror driving lever 48, which is swingable through a predetermined angle by a gear 47 held in mesh with a gear 46 connected to the motor 35.

Figure 4:
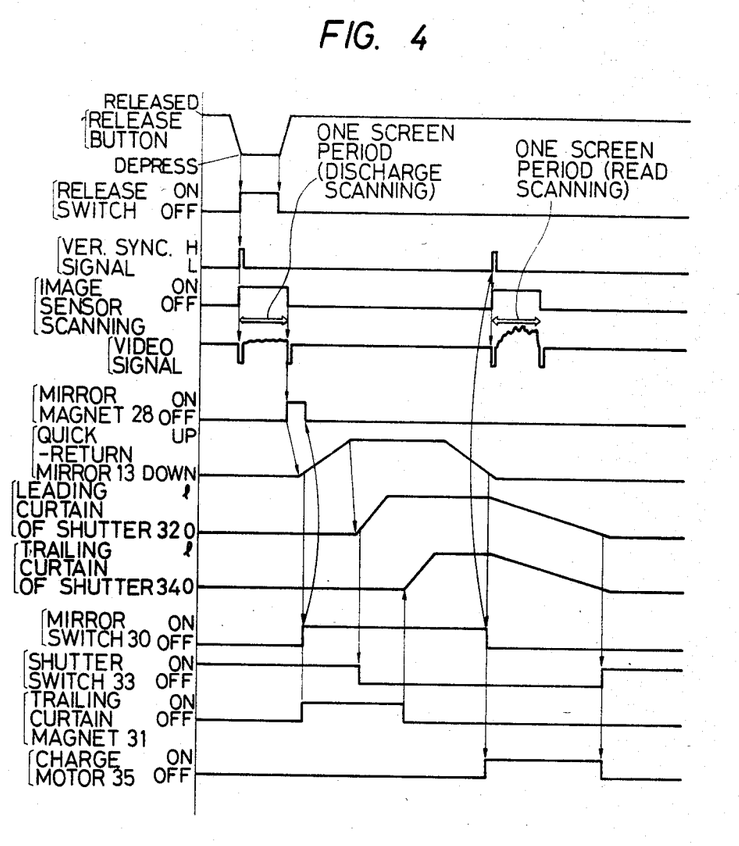
FIG. 4 is a timing chart showing operations of the arrangement of FIG. 3.

Operation of the mechanisms of the foregoing construction and the processing of signals generated during such operation of the mechanisms will be explained with reference to the timing chart of FIG. 4. When a release button on the camera body is depressed, the release switch is turned on. Simultaneously, the image sensor driver circuit 20 issues a vertical synchronizing signal to the image sensor 12 to scan the latter through one screen (one field or one frame) for discharging unwanted electric charges stored in the image sensor 12. After the image sensor 12 has been scanned to discharge the unwanted charges, the mirror magnet 28 is supplied with a release signal (ON signal). Then, the mirror-up lever engagement pawl 36 is disengaged from the mirror-up lever 37, which then slides forward under the force of the spring 38 to thus cause the cam surface 37a to push up the pin 29a and hence the quick-return mirror 13. In the initial stages of the upward movement of the mirror 13, the mirror switch 30 is turned on while simultaneously the trailing curtain magnet 31 is energized to enable the hook 41 to engage the trailing curtain 34 (at this time, the trailing curtain 34 and the leading curtain 32 are both in the driven position).

When the quick-return mirror 13 is folded up, the leading curtain disengagement lever 29c pulls the leading curtain hook 39 out of engagement with the leading curtain 32 in the final stages of the upward movement of the quick-return mirror 13. The leading curtain 32 then moves under the force of the leading curtain spring 40 to thereby allow the image sensor 12 to be exposed to incoming light.

In the initial stages of the movement of the leading curtain 32, the shutter switch 33 is turned off, and upon elapse of the exposure time thereafter as calculated by the exposure control circuit 21, the magnet 31 is supplied with a release signal (OFF signal) to bring the trailing curtain hook 41 out of engagement with the trailing curtain 34, which then moves under the force of the trailing curtain spring 42 to finish the exposure. Upon completion of the movement of the trailing curtain 34, the pin 34a forces the mirror-down lever engagement pawl 43 out of engagement with the mirror-down lever 44, which then slides under the force of the spring 45. At this time, the mirror-up lever 37 is also caused to slide with the mirror-down lever 44, whereupon the quick-return mirror 13 is lowered by gravity and under the force of the torsion spring 29d. As the mirror 13 returns, the mirror switch 30 is turned off, issuing a return signal to enable the image sensor driver circuit 20 to generate a vertical synchronizing signal pulse, which is applied to the image sensor 12 for scanning the latter through one screen (one field or one frame). Electric charges stored in the image sensor 12 while the shutter 25 is open are then read out by the signal processing circuit 26 and representations thereof are stored in the memory 27.

When the mirror switch 30 is turned off, the motor 35 is energized to drive the quick-return mirror 13 and the shutter 25. More specifically, the rotation of the motor 35 is transmitted to the gears 46 and 47 to turn the mirror drive lever 48. The mirror-down lever 44 is caused by the mirror drive lever 48 to slide forward for thereby stretching the springs 38 and 45. The mirror-down lever 44 is stopped upon engagement with the mirror-down lever engagement pawl 43, whereupon the mirror driving is completed.

The shutter is driven by causing the crank lever 49 to move the shutter charge lever 40 reciprocally in response to rotation of the gear 46. More specifically, when the projection 32a of the leading curtain 32 is pushed by the shutter drive lever 50, the pin 34a is pushed by the leading curtain 32. The leading and trailing curtains 32 and 34 then slide in unison. At this time, the leading curtain spring 40 and the trailing curtain spring 42 are stretched. The shutter driving is completed when the leading curtain 32 is engaged by the hook 39 and the trailing curtain 34 is engaged by the hook 41.

At a final stage of the shutter driving stroke, the shutter switch 33 is turned on again by the leading curtain 32 to generate a signal for de-energizing the motor 35. After the motor 35 has been supplied with such a de-energization signal, it continues to rotate idly, due to inertia, until it stops in an original position.

Figure 5:
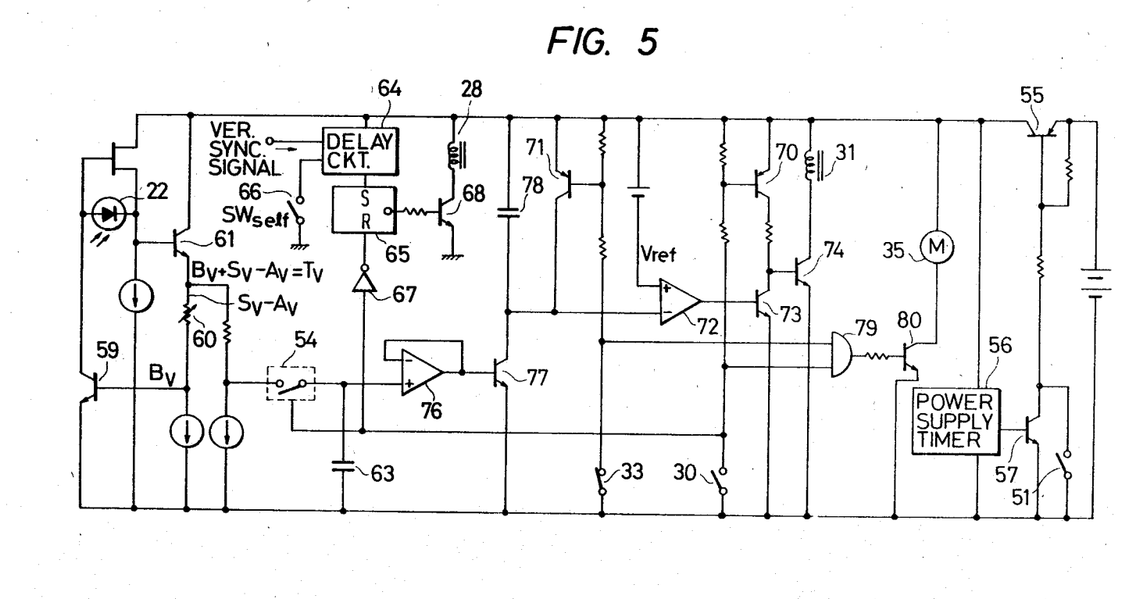
FIG. 5 is a circuit diagram showing a specific circuit arrangement of the electronic camera.

FIG. 5 is a circuit diagram showing a specific circuit used for actuating the electronic camera. In FIG. 5, the mirror switch 30, the shutter switch 33, the photometer device 22, the mirror magnet 28, the trailing curtain magnet 31, and the motor 35 are the same as described above. The circuit includes further switches, that is, a release switch 51 which is turned on when the release button is depressed, a memory switch 54 for effecting recording of image signals, and a self-timer switch 66 which is turned on when a self-timer is used. Prior to a photographing operation, the mirror switch 30, the release switch 51, the memory switch 54, and the self-timer switch 60 are turned off, while the shutter switch 33 is turned on. Since the release switch 51 is turned off, a transistor 55 is held nonconductive, and the circuit remains de-energized as it is supplied with no power.

When the release switch 51 is turned on by depressing the shutter button, the transistor 55 is rendered conductive to supply power to the circuit. A power supply timer 56 serves to issue an output to energize the transistor 57 for a certain interval of time after the circuit is supplied with power. Therefore, the power supply to the circuit is kept energized during this interval of time, even if and when the release switch 51 is turned off in such interval of time.

The photometer circuit is energized when the circuit is supplied with power. A photocurrent flowing through the photometer device 22 is subjected to logarithmic compression by a transistor 61, the base of which generates a voltage corresponding to Bv. A constant current flows through a variable resistor 60 the magnitude of which is set in accordance with a sensitivity and shutter diaphragm setting. A voltage corresponding to $Sv - Av$ is produced across the variable resistor 60. Therefore, the emitter of a transistor 61 is at a voltage $Tv = Bv + Sv - Av$. When the circuit is supplied with power, a control signal for the memory switch 54 goes low to turn on the memory switch 54 since the mirror switch 30 is turned off. The voltage Tv is then applied through a level shifting resistor and the memory switch 54 to a memory capacitor 63.

When the circuit is supplied with power, a delay circuit 64 issues a high level signal to a terminal S of an RS flip-flop 65 upon elapse of a certain period of time after the delay circuit 64 has received a vertical synchronizing signal. When the self-timer is employed, the self-timer switch 66 is turned on. The delay circuit 64 then issues a high level signal to the terminal S of the RS flip-flop 65 upon elapse of a period of time set by the self-timer after the delay circuit 64 has received a vertical synchronizing signal. Since the mirror switch 30 remains turned off, the signal applied through an inverter 67 to a terminal R of the RS flip-flop 65 is low. Therefore, when the high level signal is applied to the terminal S, the RS flip-flop 65 renders a transistor 68 conductive to energize the mirror magnet 28.

When the mirror magnet 28 is energized, the above-mentioned mechanism is actuated to turn on the mirror switch 30, thereby rendering a transistor 70 conductive. As the shutter switch 33 remains turned on, a transistor 71 is energized, making the output from a comparator 72 low. A transistor 73 remains de-energized and a transistor 74 is rendered conductive to energize the trailing curtain magnet 31. When the mirror switch 30 is closed, the control signal for the memory switch 54 goes low, turning off the memory switch 54.

When the leading curtain 32 is operated as described and the shutter switch 33 is turned off, the transistor 71 is also turned off. The output voltage of the transistor 73 is applied to the base of a transistor 77 through a buffer 76 composed of an operational amplifier which acts as a voltage follower. A current then flows through the collector circuit of the transistor 77, thereby charging a capacitor 78. When the voltage applied to the negative input terminal of the comparator 72 is lower than a reference voltage $V_{ref}$ applied to the positive input terminal thereof, the output from the comparator 72 goes high to turn on the transistor 73. The transistor 74 is then turned off to de-energize the trailing curtain magnet 31, whereupon the trailing curtain 34 starts to move.

The movement of the trailing curtain 34 enables the foregoing mechanism to turn off the mirror switch 30 again. Since the shutter switch 33 is turned off at this time, both input signals to an AND gate 79 go high, and the AND gate 79 issues an output signal of a high level. A transistor 80 is now rendered conductive to energize the motor 35 which starts to rotate.

When the shutter switch 33 is turned on again in response to the rotation of the motor 35, the output signal from the AND gate 79 goes low to turn off the transistor 80, whereupon the motor 35 is stopped.

Upon the elapse of a certain interval of time, the output signal from the power supply timer 56 goes low to turn off the transistor 57. Unless the release switch 51 is turned on at this time, the transistor 55 is turned off to cut off the power supply to the circuit, which is then placed into the original condition.

Figure 6:
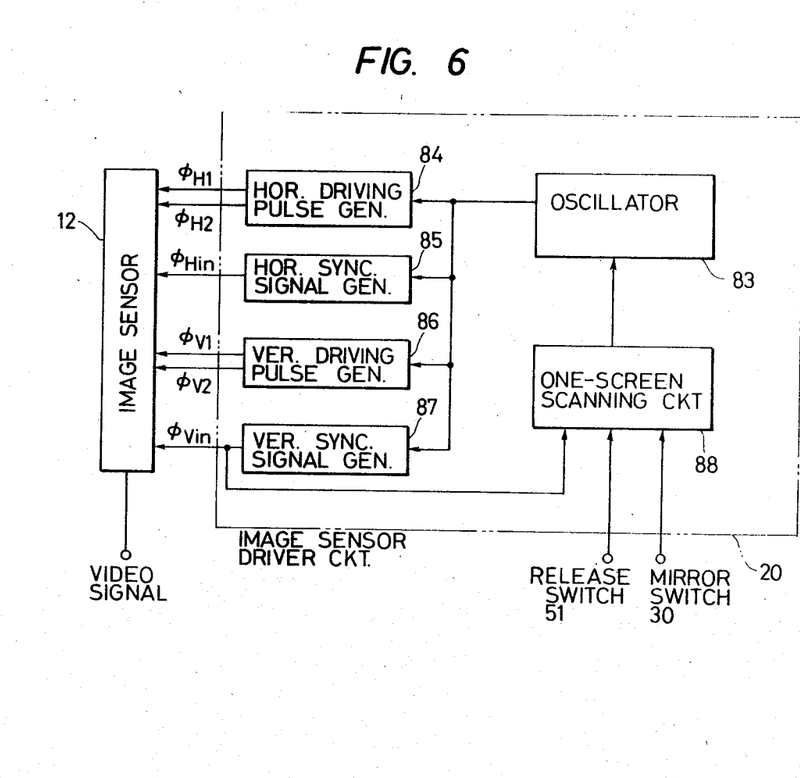
FIG. 6 is a block diagram of a first preferred embodiment of an image sensor driver circuit of the invention.

FIG. 6 is a circuit diagram showing a specific construction of the image sensor driver circuit 20. The image sensor driver circuit 20 includes an oscillator 83, a horizontal driving pulse generator 84, a horizontal synchronizing signal generator 85, a vertical driving pulse generator 86, a vertical synchronizing signal generator 87, and a one-screen scanning circuit 88. When a signal from the release switch 51 is applied to the one-screen scanning circuit 88 in a released condition, the one-screen scanning circuit 88 issues a reset signal to the oscillator 83. When reset, the oscillator 83 returns to an initial condition to issue pulses to the horizontal driving pulse generator 84, the horizontal synchronizing signal generator 85, the vertical driving pulse generator 86, and the vertical synchronizing signal generator 87. In response to the supplied pulses, these generators produce horizontal driving pulse signals $\phi_{H1}$, $\phi_{H2}$, a horizontal synchronizing signal $\phi_{Hin}$, vertical driving pulse signals $\phi_{V1}$, $\phi_{V2}$, and a vertical synchronizing signal $\phi_{Vin}$, respectively. These pulses and signals are fed to the image sensor 12 which then operates to produce a video signal. The vertical synchronizing signal $\phi_{Vin}$ is also applied to the one-screen scanning circuit 88 to reset the oscillator 83 when one field or one frame has been scanned. At such times, a signal from the mirror switch 30 is fed to the one-screen scanning circuit 88 to start a charge-reading scanning operation, and the oscillator 83 is released of the reset condition again to scan the image sensor 12 over one screen (one field or one frame). The video signal produced by the image sensor 12 at this time serves as a still-image signal.

Figure 7:
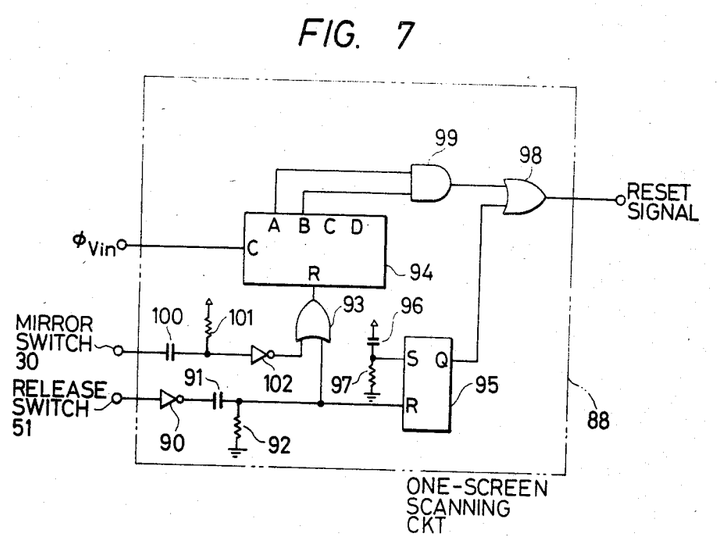
FIG. 7 is a circuit diagram of a first embodiment of a specific circuit arrangement of a one-screen scanning circuit.

FIG. 7 is a block diagram showing a specific arrangement of the one-screen scanning circuit 88. Upon an application of power, the Q terminal of an RS flip-flop 95 is rendered high by the function of a capacitor 96 and a resistor 97 coupled in series with each other. More specifically, at the time when the power is supplied to the circuit, the capacitor 96 is rendered conductive transiently thereby resulting in a voltage drop appearing across the resistor 97. Due to the voltage drop, a high level signal is applied to the S terminal of the flip-flop circuit 95 so as to set the circuit 95. As a result, the terminal Q of the circuit 95 is rendered high. After a certain period of time determined by the time constant of the capacitor 96 and resistor 97 lapses, a current flowing through the resistor 97 becomes zero so that the S terminal is rendered low again. Therefore, the Q terminal thereof is maintained high. When the release button is depressed, the signal from the release switch 51 goes low and is applied to the one-screen scanning circuit 88, a falling edge of the signal is detected by a differentiating circuit composed of an inverter 90, a capacitor 91, and a resistor 92. A pulse produced by the differentiating circuit is applied to an OR gate 93 to reset a counter 94. At the same time, an RS flip-flop 95 is reset, rendering low the terminal Q thereof which has been rendered high as described above. An output signal from the terminal Q is fed through an OR gate 98 to render the reset signal low, thus releasing the oscillator 83 of the reset condition. From this time one, pulses for driving the image sensor 12 are generated to apply the vertical synchronizing signal $\phi_{Vin}$ to a terminal C of the counter 94. When three pulses of the vertical synchronizing signal $\phi_{Vin}$ have been counted, the output signal from an AND gate 99 goes high to render the reset signal from the OR gate 98 high, thereby resetting the oscillator 83 again. The image sensor 12 is now stopped in its driving operation.

When the signal from the mirror switch 30 goes low after an exposure has been completed, a falling edge of this signal is detected by a differentiating circuit composed of a capacitor 100, a resistor 101, and an inverter 102. A pulse generated by this differentiating circuit enters the OR gate 93 to reset the counter 94. The reset signal goes low again at this time to release the oscillator 83 from the reset condition. When three pulses of the vertical synchronizing signal are counted, the reset signal goes high to stop the driving operation of the image sensor 12. The electric charges are thus discharged and read out of the image sensor for one frame. For scanning the image sensor 12 over one field, two pulses of the vertical synchronizing signal $\phi_{V1}$ should be counted by the counter 94.

Figure 8A:
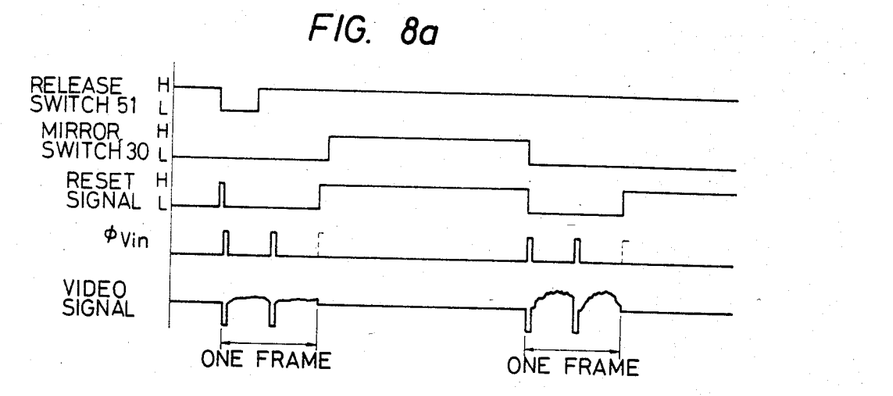
FIGS. 8a and 8b are timing charts showing operations of the image sensor driver circuit of FIG. 6.
Figure 8B:
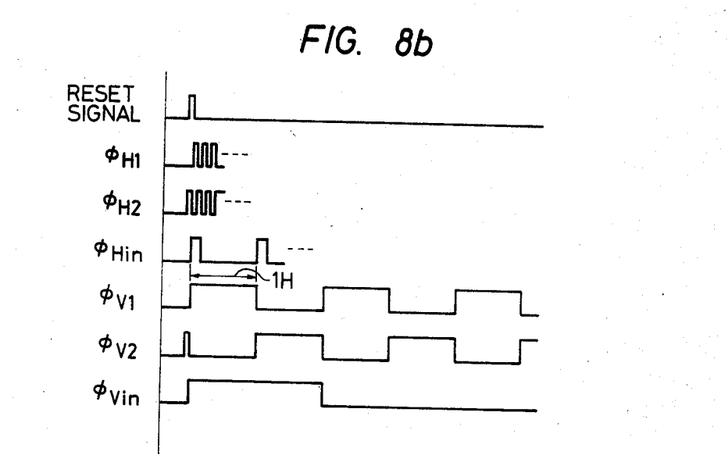

FIG. 8a is a timing chart illustrative of the operation of the image sensor driver circuit 20 in scanning the image sensor 12 to discharge unwanted electric charges and to read an image signal by generating the vertical synchronizing signal $\phi_{Vin}$ aperiodically with the signals from the release switch 51 and the mirror switch 30. FIG. 8b is a timing chart showing the horizontal driving signals $\phi_{H1}$, $\phi_{H2}$, the horizontal synchronizing signal $\phi_{Hin}$, the vertical driving pulse signals $\phi_{V1}$, $\phi_{V2}$, and the vertical synchronizing signal $\phi_{Vin}$ for driving the image sensor driver circuit 20.

Figure 9:
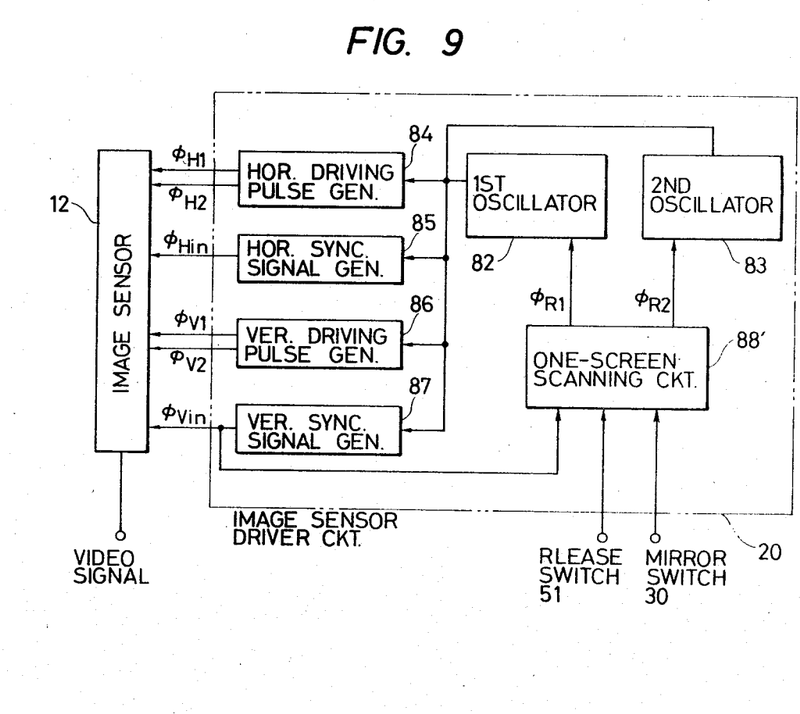
FIG. 9 is a block diagram of a second embodiment of an image sensor driver circuit of the invention.

FIG. 9 is a block diagram of another embodiment of the image sensor driver circuit 20, wherein like reference numerals identify components in common with the embodiment of FIG. 6. The image sensor driver circuit 20 of this second embodiment includes a first oscillator 82, a second oscillator 83, a horizontal driving pulse generator 84, a horizontal synchronizing signal generator 85, a vertical driving pulse generator 86, a vertical synchronizing signal generator 87, and a one-screen scanning circuit 88'. When a release start signal from the release switch 51 is applied to the one-screen scanning circuit 88', the one-screen scanning circuit 88' issues a discharge scanning signal through the second oscillator 83 to the image sensor 12. When an exposure completion signal from the mirror switch 30 is applied to the one-screen scanning circuit 88', the latter issues a read scanning signal through the first oscillator 82 to the image sensor 12. The frequency $f_2$ of the signal generated by the second oscillator 83 and the frequency $f_1$ generated by the first oscillator 82 satisfy at least the relationship $f_2 \geq f_1$, for example, $f_2 = nf_1$ where n is a positive integer.

More specifically, when the signal from the release switch 51 is applied to the one-screen scanning circuit 88' indicating a released condition, the scanning circuit 88' resets the first oscillator 82 and releases the second oscillator 83 from the reset condition. When the second oscillator 83 is released from the reset condition, it returns to an original condition and issues pulses to the horizontal driving pulse generator 84, the horizontal synchronizing signal generator 85, the vertical driving pulse generator 86, and the vertical synchronizing signal generator 87. In response to the supplied pulses, these generators produce horizontal driving pulse signals $\phi_{H1}$, $\phi_{H2}$, a horizontal synchronizing signal $\phi_{Hin}$, vertical driving pulse signals $\phi_{V1}$, $\phi_{V2}$, and a vertical synchronizing signal $\phi_{Vin}$, respectively, as before. These signals are fed to the image sensor 12 which produces a video signal accordingly. The vertical synchronizing signal $\phi V_{in}$ is also applied to the one-screen scanning circuit 88' to reset the oscillator 83 when one field or one frame has been scanned. At this time, the first oscillator 82 remains reset. Then, a signal from the mirror switch 30 is fed to the one-screen scanning circuit 88' to start a read scanning operation, the first oscillator 82 is released from the reset condition again to scan the image sensor 12 through one screen (one field or one frame). The video signal produced by the image sensor 12 at this time serves as a still-image signal.

Figure 10:
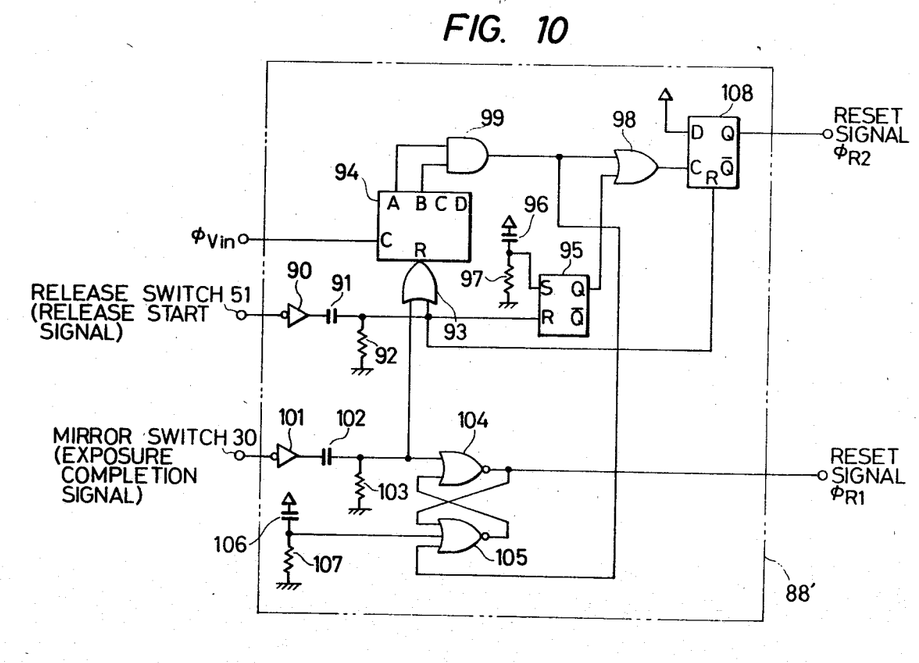
FIG. 10 is a circuit diagram of a second embodiment of a specific circuit arrangement of a one-screen scanning circuit.

FIG. 10 is a circuit diagram showing a specific circuit arrangement for the one-screen scanning circuit 88'. When the release button is depressed, the signal from the release switch 51 goes low. The signal is inverted by the inverter 90 to produce a high level, and a trigger pulse produced by the differentiating circuit composed of a capacitor 91 and a resistor 92 is applied to the counter 94 through the OR gate 93 and also to the RS flip-flop 95 and a D flip-flop 108 to reset these flip-flops. The terminal Q of the RS flip-flop 95 which has been rendered high by a capacitor 96 and a resistor 97 goes low, and the terminal Q of the D flip-flop 108 also goes low. Since the output at the terminal Q of the D flip-flop 108, that is, a reset signal $\phi_{R2}$, then changes from a high level to a low level, the second oscillator 83 is released of the reset condition. From this time on, the second oscillator 83 starts to operate to generate pulses for driving the image sensor 12 for applying the vertical synchronizing signal $\phi V_{in}$ to the terminal C of the counter 94. When three pulses of the vertical synchronizing signal $\phi_{Vin}$ have been counted, the output from the AND gate 99 goes high, as does the output of the OR gate 98, which is coupled to a terminal C of the D flip-flop 108. The terminal Q of the D flip-flop 108 then goes high, and the reset signal $\phi_{R2}$ produced therefrom also goes high to reset the second oscillator 83. Simultaneously, the output from the AND gate 99 is fed to a NOR gate 105, which together with a NOR gate 104 constitutes a flip-flop. When the power supply is turned on, the output of the NOR gate 104 is at a high level, and hence the output from the NOR gate 105 remains high even if a high-level signal is applied to an input terminal of the NOR gate 105.

When the signal from the mirror switch 30 goes low after an exposure operation has been completed, this low-level signal is inverted by an inverter 101 to produce a high level, with this change being converted into a positive trigger pulse by a differentiating circuit composed of a capacitor 102 and a resistor 103. The positive trigger pulse is applied through the OR gate 93 to the counter 91 to reset the latter, and also serves to toggle the flip-flop composed of the NOR gates 104 and 105. The high-level output from the NOR gate 104 then goes low. A reset signal $\phi_{R1}$, which is the output from the NOR gate 104, therefore goes low to release the first oscillator 82 from the reset condition. The first oscillator 82 now operates to generate pulses for driving the image sensor 12 and to apply the vertical synchronizing signal $\phi_{Vin}$ to the terminal C of the counter 94, which counts the pulses of the vertical synchronizing signal $\phi_{Vin}$. When three pulses of the vertical synchronizing signal $\phi_{Vin}$ have been counted, the output from the AND gate 99 goes high and toggles the flip-flop constituted by the NOR gates 104 and 105, whereupon the output from the NOR gate 104, which has been low, goes high.

The first and second oscillators 82 and 83 are therefore reset to stop the driving operation of the image sensor 12. The image sensor 12 is thus scanned for discharging and reading out electric charges stored therein. Since the frequency of the second oscillator 83 which operates in the discharge scanning operation is higher than the frequency of the first oscillator 82 which operates in the reading scanning operation, the discharge scanning operation can be effected in a short period of time immediately after the release signal is applied. For scanning the image sensor 12 over one field, two pulses of the vertical synchronizing signal $\phi_{V1}$ should be counted by the counter 94.

Figure 11A:
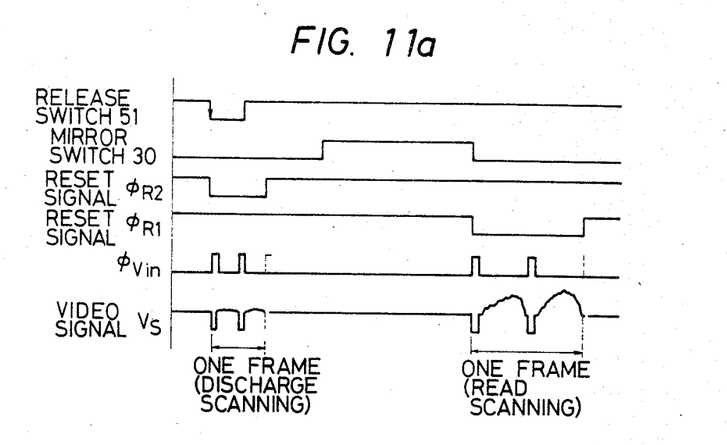
FIGS. 11a and 11b are timing charts showing operations of the image sensor driver circuit of FIG. 9.
Figure 11B:
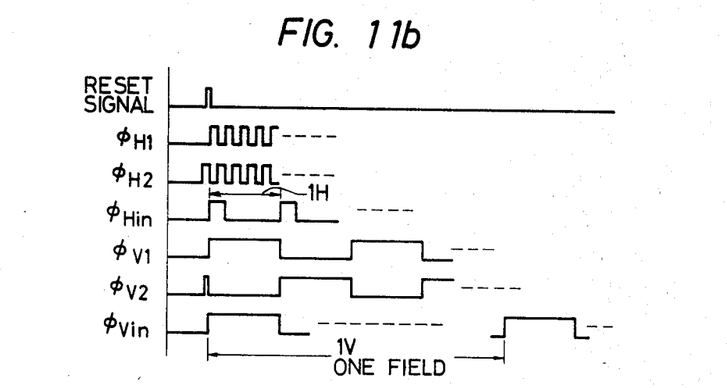

FIG. 11a is a timing chart illustrating the operation of the image sensor driver circuit 20 for scanning the image sensor 12 to discharge unwanted electric charges and read an image signal by generating the vertical synchronizing signal $\phi_{V1}$ with the signals from the release switch 51 and the mirror switch 30. It will be understood that the discharge scanning is effected in a shorter period of time than that of the reading scanning. FIG. 11b is a timing chart showing the horizontal driving pulse signals $\phi_{H1}$ and $\phi_{H2}$, the horizontal synchronizing signal $\phi_{Hin}$, the vertical driving pulse signals $\phi_{V1}$, $\phi_{V2}$, and the vertical synchronizing signal $\phi_{Vin}$ for driving the image sensor driver circuit 20.

With the electronic camera according to the present invention, as described above, an object can be observed through a bright viewfinder because of the quick-return mirror employed, and a still image of good quality can be obtained since the entire quantity of light from the object, even if it is dark, reaches the image pickup device. The vertical synchronizing signal generator issues the vertical synchronizing signal to the image pickup device aperiodically to discharge stored electric charges immediately prior to shutter release and reads out stored electric charges immediately after an exposure has been finished. Therefore, a good image signal free from the influence of a dark current is generated, and successive photographing operation is rendered possible.

Further, with the present invention, as described above, the image pickup device of an electronic camera is electrically scanned prior to and subsequent to each photographing operation, and the frequency of scanning for discharging stored electric charges prior to the photographing operation is higher than the frequency of scanning for reading out stored electric charges subsequent to the photographing operation. Therefore, the adverse influences of dark current are reduced to a minimum, thereby increasing the quality of the sensed image.

We claim:

1. An electronic camera comprising: an optical viewfinder system; an image pickup device for photoelectrically converting the image of an object focused by a photographic lens; a memory for storing an image signal generated by said image pickup device; a shutter for controlling the flux of light from the object image falling on said image pickup device; an exposure control device for controlling an exposure through said shutter dependent on the brightness of the object image; a quick-return mirror normally positioned in a path of the flux of light from the object image for guiding the flux of light into said optical viewfinder system, said quick-return mirror being retractable out of said path for allowing the flux of light to fall on said image pickup device; a release switch for generating a photographing start signal; and a vertical synchronizing signal generator for issuing a vertical synchronizing signal aperiodically to said image pickup device, said vertical synchronizing signal generator comprising means for issuing a signal for discharging electric charges stored in said image pickup device after said release switch has been turned on and before said quick-return mirror starts being retracted out of said path and for issuing a signal for reading out electric charges which have been stored in said image pickup device while said shutter is being open after an exposure operation has been finished by said shutter.

2. The electronic camera according to claim 1, wherein said signal for reading out the electric charges is generated in synchronism with a signal indicative of return of said quick-return mirror to a condition prior to being retracted out of said path.

3. The electronic camera according to claim 1, further comprising a motor for driving said quick-return mirror and said shutter, said motor being energizable by a signal indicative of an end of travel of said shutter and de-energizable by a signal indicative of return of said quick-return mirror to a condition prior to being retracted out of said path.

4. An electronic camera comprising: an image pickup device for photoelectrically converting the image of an object focused by a photographic lens; scanning circuit means for electrically scanning said image pickup device prior and subsequent to a photographing operation for discharging and reading out electric charges stored in said image pickup device with a frequency of scanning for discharging the electric charges by said scanning circuit means prior to photographing being higher than a frequency of scanning for reading out the electric charges subsequent to the photographing operation; a memory for storing an image signal read out of said image pickup device; a shutter for controlling the flux of light from the object image falling on said image pickup device; an exposure control device for controlling an exposure through said shutter dependent on the brightness of the object image; a release switch for actuating said shutter; and a quick-return mirror normally positioned in a path of the flux of light from the object image for guiding the flux of light into an optical viewfinder system, said quick-return mirror being retractable out of said path for allowing the flux of light to fall on said image pickup device, said release switch being capable of issuing, upon being turned on, a signal for starting the scanning for discharging the electric charges by said scanning circuit, wherein said signal for starting the scanning to reading the electric charge is generated in synchronism with a signal indicative of return of said quick-return mirror to a condition prior to being retracted out of said path.

5. In an electronic still camera comprising an optical viewfinder for viewing an image of an object to be photographed, an image pickup device for photoelectrically converting said image, a memory device for storing a still-image signal produced by said image pickup device, shutter means for controlling a flux of light from said image falling on said image pickup device, and mirror means for selectively guiding said flux into said optical viewfinder, the improvement wherein:

said shutter means compirses: first and second curtains; first means for exerting force on said first and second curtains in a first direction; second means for holding said first and second curtains against said force; third means for disengaging said first and second curtains from said second means, whereby said first and second curtains become movable in said first direction; and a motor for driving said first and second curtains;

said mirror means comprises: a mirror; a shaft on which said mirror is mounted at a first end thereof, said mirror being swingable about said shaft; means for normally urging said mirror to a first position for guiding said flux into said optical viewfinder; means for moving said mirror to a second position, different from said first position, when images are to be recorded on said image pickup device; and means, responsive to movement of said second curtain, for returning said mirror to said first position after said images have been recorded and before said unwanted charges have been discharged from said image pickup device;

generating means for generating a first signal; and issuing means for issuing a second signal aperiodically to said image pickup device, said issuing means comprising means for issuing a signal for discharging electric charges stored in said image pickup device after said generating means has been turned on and before movement of said mirror from said first position to said second position has been initiated and for issuing a signal for reading out electric charges which have been stored in said image pickup device while said shutter means is being open after an exposure operation has been finished by said shutter means.

* * * * *